Jan. 9, 1951
B. C. BOECKELER
2,537,811
METHOD AND APPARATUS FOR SEPARATING
GLUTEN AND WHEAT FLOUR
Filed May 22, 1946
2 Sheets-Sheet 2
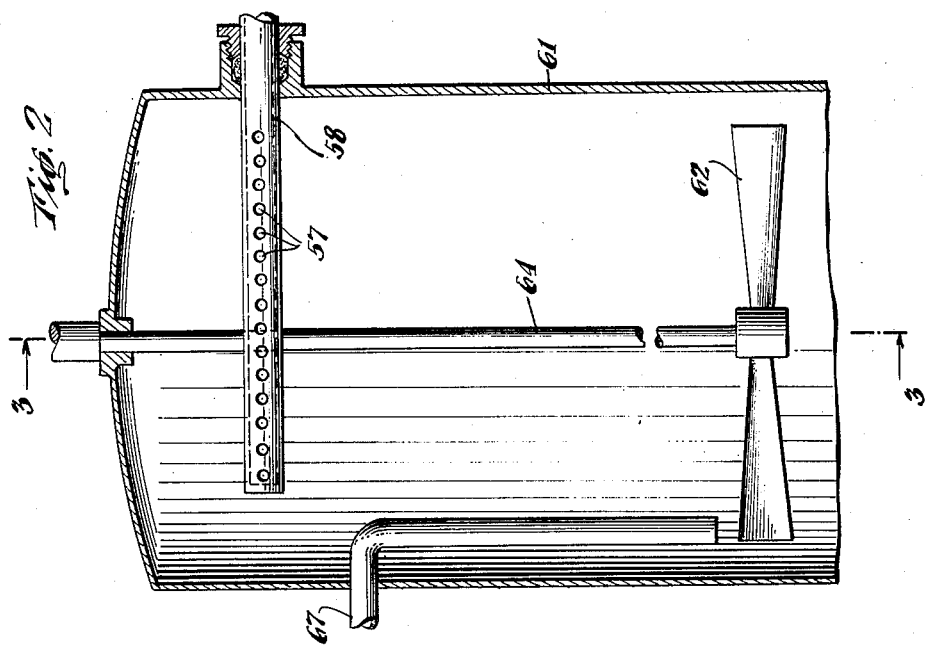
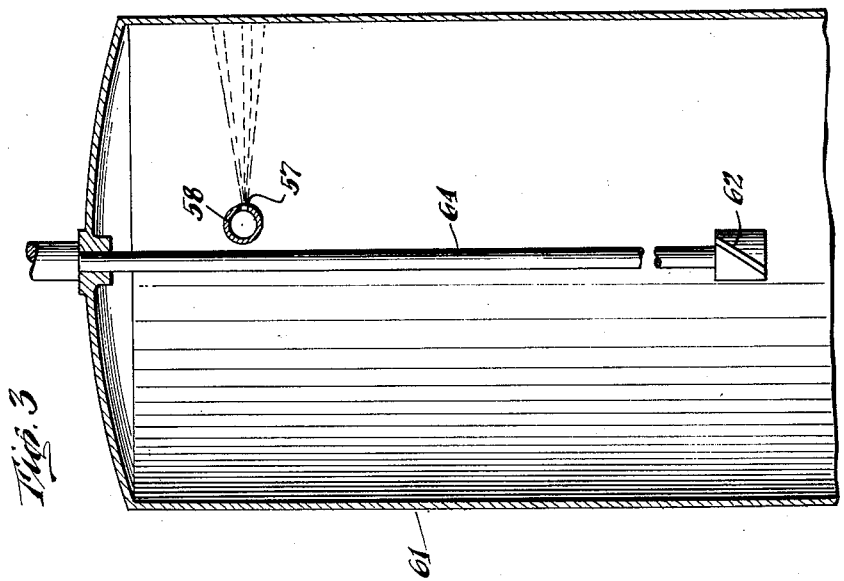
INVENTOR
*Benjamin Clark Boeckeler*
BY
*Norman N. Holland*
ATTORNEY Patented Jan. 9, 1951

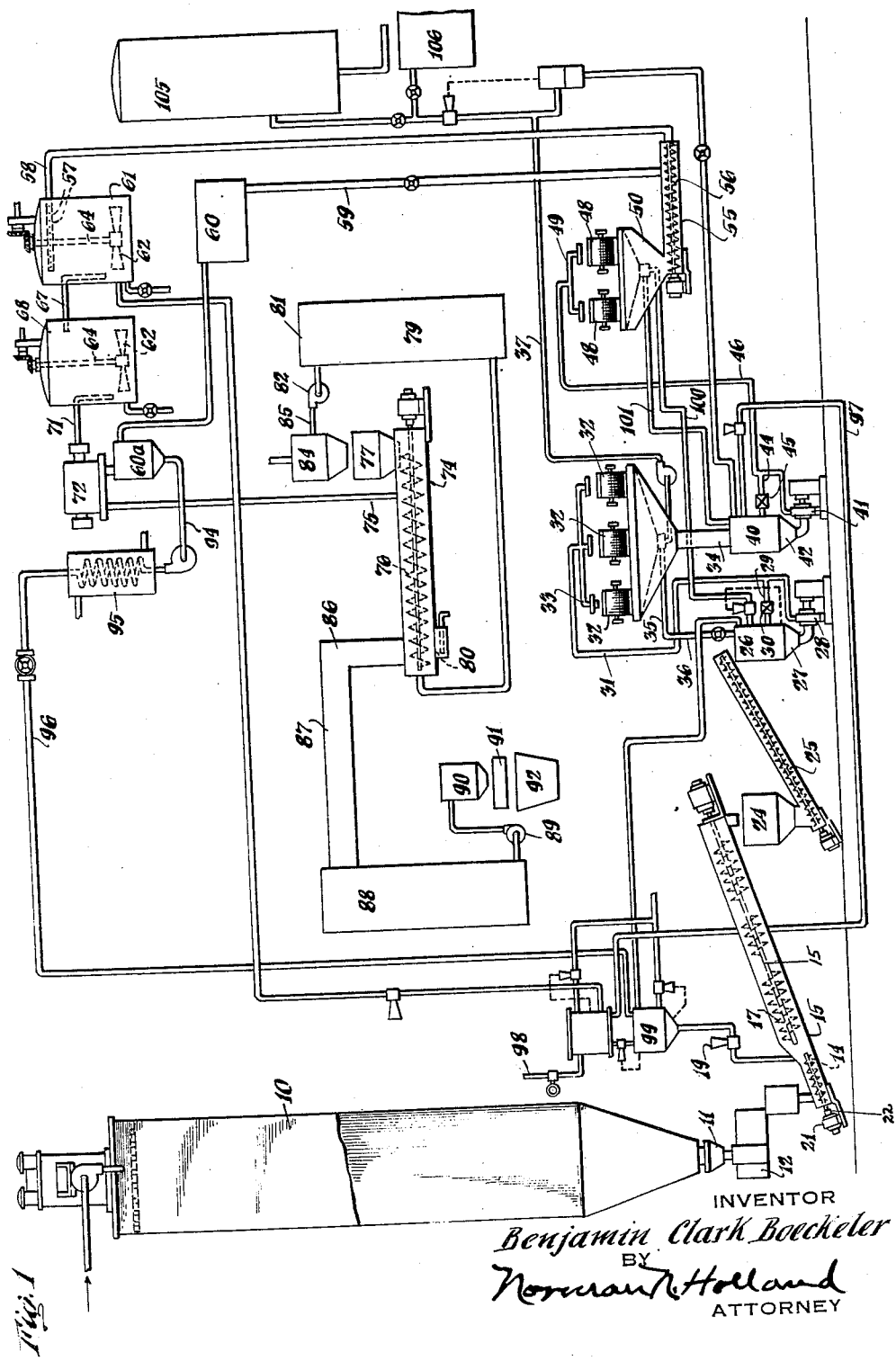

2,537,811

UNITED STATES PATENT OFFICE 2,537,811

METHOD AND APPARATUS FOR SEPARATING GLUTEN AND WHEAT FLOUR

Benjamin Clark Boeckeler, Grosse Ile, Mich., assignor, by mesne assignments, to Trenton Chemical Company, Trenton, Mich., a corporation of Michigan Application May 22, 1946, Serial No. 671,438

4 Claims. (Cl. 260—112)

In prior patent applications Ser. No. 530,228 filed April 8, 1944, now Patent No. 2,530,823, issued November 21, 1950, and Ser. No. 652,140, filed March 5, 1946, owned by the assignee hereof, a process for the separation of gluten from wheat flour was described in which wheat flour was agitated in water to produce agglomerates of gluten and these, carried in the starch-bearing water, were flowed over inclined screens described as 60-mesh screens to screen out the gluten.

The gluten was then, in the later application, forced by a screw pump through a pipe so that it was forcibly dropped in strings through small bottom openings in the pipe, into the hot water of a devitalizing tank, and there was mechanically agitated.

The devitalized gluten was then filtered and dried, the filtrate being returned to the flour agitation for reuse, while the gluten was dried and sold.

It was found that the liquid in the devitalizing tank carried a highly objectionable foam and also carried a substantial proportion of colloidal gluten particles, only a few microns across, and both the foam and the colloidal gluten introduced serious problems. First, the foam was difficult to control and seemed to carry a large proportion of the colloidal gluten. Secondly, the fine gluten particles passed through filters and were lost or they contaminated the starch water if returned for reuse, and they introduced other problems by reason of the slimy nature of the contained hydrolyzed gluten and starch. The effluent, which in the form shown goes back to serve as mixing water for the flour dough, may carry 2% to 4% of solids of which 40% to 60% may be protein particles largely in this objectionable form. Moreover, objectionable foam subsequently interfered with efficient agitation of the flour in the water.

Thirdly, the gluten and the pasted starch created a particularly tenacious foam and interfered with the formation of desirable masses of gluten. Moreover, the foam prevented the agitation in the devitalizer from breaking the gluten into particles of the desired size, say ¼ inch across. For the foregoing reasons, it was often found useful to add an anti-foaming agent.

According to the present invention, the devitalizing operation may be so conducted as to eliminate the need for an anti-foaming agent which is expensive and yet will avoid a large part of the formation of that foam and eliminate a large part of those colloidal particles. This elimination of foam at the devitalizers greatly reduced the foam elsewhere.

To attain these and other ends, the gluten sent on by the screw pump according to the present invention is so delivered to the devitalizer water that the gluten enters the water relatively quietly with the result that the gluten is washed by the hot water of the devitalizer but not so broken up as to yield a large proportion of finely divided protein particles. As a result, little or no foam is produced and the filtering of the devitalized gluten proceeds rapidly, more gluten is recovered, and the recovered water is better suited for reuse and creates less foam elsewhere.

To cause the gluten to thus enter the hot water quietly, it was found sufficient to expel the gluten into the devitalizing tank through openings which allowed the gluten to fall into the water while the accompanying water, air and steam under pressure were directed to another zone, away from the falling gluten. This end was attained very simply by so locating the openings that they delivered the issuing water, air and steam in a horizontal stream while the small streams of issuing gluten, which accompanied them, dropped out of the stream almost at once into water which was agitated relatively gently.

An object of the present invention is to improve the quality of gluten recovered from flour.

Another object of the present invention is to recover more of the gluten.

Another object of the present invention is to eliminate factors which interfere with the smooth operation of the process.

Another object of the invention is to eliminate objectionable foaming in recovered water when reused.

Another object of the invention is to avoid the production of overfine gluten.

Still another object of the invention is to avoid the need for adding an anti-foaming agent.

A still further object of the invention is to provide simple mechanical structures for smoothly and efficiently operating the gluten recovery procedures.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings forming a part of the specification, wherein:

Fig. 1 shows diagrammatically a flow sheet and apparatus suitable for carrying out one form of the invention, numerous parts being compressed or distorted or relocated diagrammatically in order to simplify the disclosure;

Fig. 2 is a sectional view of a devitalizing tank showing the horizontal openings; and Fig. 3 is a section at right angles to Fig. 2 showing a sectional end view of the openings.

In the form of the invention shown, ground grain, in the form of flour about 40-mesh or finer, from which bran has been removed, is fed in measured quantities from a bin 10 through a measuring and feeding device 11, and through a sifter 12 adapted to sift out foreign materials such as bits of paper and splinters of wood, passing the flour into the lower end of a mixer 14. If durum wheat is used the bin 10 may stand in front of an identical bin, one bin supplying the durum flour and the other the standard flour.

The mixer 14 is diagrammatically shown as an inclined spiral screw feeder delivering to a second inclined screw feeder 17 with interruptions 15 at intervals to provide relatively quiet pools of the material at intervals, thus effectively stirring the whole but giving some other opportunity for the gluten to agglutinate. Where added capacity is needed two such feeders 14 may feed in parallel and instead of quiet pools the shaft of the screw feeder may carry paddles where interrupted to agitate the dough at those points.

The amount of bran removed from the flour or grain will vary with the purpose for which the gluten-free starch is to be used. In the manufacture of alcohol about 16% of the wheat is so removed as bran, while for the production of starch for many other uses about 25% or 30% of the wheat is often removed as bran and middlings.

Measured quantities of water conveniently measured by a flowmeter 19 are delivered to the mixer 14 on top of the charge of flour in it, and this water may be fresh water but is preferably recovered water from a later devitalizing step described below.

The mixer 14 is shown as having a shaft including a motor 21 to drive the shaft through suitable gearing 22. It is found that a pound of water to every pound of flour is a satisfactory charge for the mixer 14 with many flours although the most effective amount will vary with the flours used and rather less water is often equally satisfactory. It is only needful, usually, that enough water be present to enable the mixer 14 to convey the flour and not so much water as to make the resulting dough too soupy. An inclination of about fifteen degrees seems most satisfactory in an upward feed. The best results are usually obtained when the finished dough in the mixer 14 is about 90° F. to 105° F.

The dough from the mixer 14 is shown as dropping into a retention chamber 24 from which a further inclined screw conveyor 25 takes it and drops it into a primary washer 26, shown as an open tall cylindrical tank and containing enough water to keep a mixture of about four pounds of water to one pound of flour. This maintains a specific gravity of about 1.075.

The washing process is found to work best at lower temperature than that used for mixing the dough. Thus washing at a temperature of 40° F. to 80° F. is found most satisfactory. The water added to dough or batter to make the proper mixture is preferably water recovered from a secondary washing.

Here the aqueous suspension of flour is agitated, and in the form shown the agitation is maintained by withdrawing the suspension by a centrifugal pump 28 from the conical bottom 27 of the washer 26 and returning it by a pipe 29 from the pump to a point below the top of the liquid in the washer 26.

Part of the agitated suspension of fine starch carrying small gluten particles formed by this agitation and drawn off by the pump 28 is shown as cut off by a valve 30 and goes through a pipe 31 to an inclined primary vibrating de-watering screen 32. The most satisfactory form of screen so far found is made of stainless steel wire forming a screen of about 30-mesh.

In delivering the agitated mixture of flour and gluten to the screen, it is found preferable to deliver it over a spreader 33. The screened out gluten is shown as delivered to a chute 34 and the screen as delivering the starch-bearing water to a valved pipe system 35 which is adapted to split the starch-bearing water if desired. It may return some water by valved pipe 36 and to the washer 26, but usually sends all by valved pipe 37 as a finished starch-bearing water for fermentation as for alcohol at 105 or for the production of dry starch at 106.

The mass of gluten particles removed by the screen 32 is shown as delivered to a secondary washer 40 provided with a centrifugal agitation pump 41 which may be identical with the pump 28, the pump withdrawing the starch suspension through a conical bottom 42 so as to re-circulate part of the contents of the tank, returning it through a return pipe 44.

The remainder of the agitated mixture of starch and gluten circulating in the washer or tank 40 is shown as separated off by a second valve 45 which may be identical with the valve 30, and sent by a pipe 46 to an inclined secondary screen 48 which may be identical with the screen 32, although a screen of half the size may be satisfactory.

The liquid coming through the pipe 46 is shown as delivered to a spreader 49 for spreading the liquid over the screen 48 and the spreader may be identical with the spreader 33 of the primary screen 32.

The gluten recovered on the screen 48 is shown as delivered by a chute 50 to a screw pump 55 which forces the gluten and added water by a screw diagrammatically shown at 56 so that the gluten passes out through side openings or slits (see Figs. 2 and 3) near the end of a conduit pipe 58. Usually the openings and slits 57 are a quarter to half inch in diameter.

This delivering of the gluten to the devitalizer by side openings in the pipe 58 turns out to result in far-reaching changes, improving the efficiency of the process of gluten separation both here and at other points.

The foam and the small particles of gluten, say 5-micron and smaller, had been introducing difficulties in filtering.

The foam is now almost eliminated by delivering the gluten at 57 horizontally and the small particles of gluten are greatly reduced in number and cease to be a major problem in filtering.

The water for the gluten entering the pump 55 is shown as coming through a pipe 59 from a storage tank 60a through a constant head tank 60, and the water may be in part water recovered later from a filter and in part fresh water added to the system, say 30% to 40% of the fresh water entering the operating system.

The extruded small lumps or very short ropes falling from the copper pipe slots 57 fall into a turbo-mixer 61 which serves as a heated devitalizer to which water is added and in which agitation is maintained by vanes 62 on a vertical rotating shaft 64. Such small ropes or lumps of gluten are easily washed efficiently.

Gluten, after agitation in the turbo-mixer 61, passes off as a suspension through a conduit 67 to a second similar turbo-mixer 68 with similar shaft 64 and vanes 62.

From the second turbo-mixer 68 the gluten is shown as conveyed by gravity by conduit 71 to a centrifugal separator 72, where the wet gluten is separated from the excess liquid.

Water from the tank 60a may be used in the dough mixer 14. It is found that flour mixed with water coming from a devitalizer produces gluten that agglutinates much better, and often there is just about enough of the water leaving the separator 72 to make a suitable batter or dough. By using the above described horizontal introduction of gluten into the devitalizer, it is found that the returned water from tank 60a yields no objectional foam in the dough mixer 14.

The gluten leaving the centrifuge carries about 72% of water and it is found advantageous to reduce this water content to 56% or 60% before final drying to prevent sticking in the driers.

To effect this reduction in contained water, the wet gluten is shown as delivered to a stream of dry gluten and then dried, and part of the thus dried gluten is returned to form the stream to which the filtered wet gluten is delivered.

In the form shown the centrifuge 72 is shown as delivering the wet filtered gluten to a screw conveyor 74 after the conveyor 74 has received its load of dry gluten so that the stream of wet gluten comes in at the side at 75 when the helical screw 76 is already partly loaded with dry gluten delivered to it by a hopper 77.

The stream of mixed gluten in the conveyor 74 is in part delivered to a drying device conventionally shown at 79, usually about 50% being removed by dropping through an adjustable slot 80 in the bottom of the conveyor 74 for final drying as described below.

The gluten entering the dryer 79 is shown as recycled to provide the dry gluten to be fed into the hopper 77.

The gluten in the dryer 79 is shown as issuing at the end 81 away from the conveyor 74 and sent on by a fan 82 to a cyclone separator 84 through a conduit 85, so the separator may deliver dry gluten to the hopper 77.

The gluten which fell through the slot 80 is shown as carried by belt conveyors 86, and 87 to a second dryer 88, where the final product is produced and drawn off by a fan 89 and sent to a cyclone separator 90 from which it drops into a bin 91 which stores it temporarily until bagged by a bagger 92.

The water from the centrifuge 72 may enter the storage tank 60a at a temperature of 190° or higher and then flow through a pipe 94 and a cooling device 95 and then to the dough mixer 14 through a valved pipe 96.

Usually 20% to 30% of the fresh water used in the system enters through a valved pipe 97 to wash the gluten separated by the screen 32, and the remainder is supplied direct to the valved pipe 98 to the storage tank 99 and so to the mixer 14. The separated starch-bearing water from the screens 32 and 49 may be sent on as starch water by the line 37 for factory conversion but the water from the secondary screen 49 is usually returned to the first washer 26 by a pipe 100, or to the secondary washer by a pipe 101, thus making a counter current operation.

In starting the equipment, all the wet gluten is delivered to the first dryer until sufficient dry gluten accumulates to start the process described above.

It will be seen that a far-reaching improvement in recovering gluten is effected by the simple device of quietly entering the washed particles of recovered gluten into the devitalizing tank water which not only eliminates or sufficiently reduces foam at this point, but enables water to be reused elsewhere without converting to foam in those other places the potential foam hitherto formed at the devitalizers. This improvement, therefore, eliminates or sufficiently reduces both actual foam and potential foam and modifies the whole process without destroying the utility of first mixing the dough with recovered water.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a process for recovering gluten from flour and substantially avoiding foaming during the separation of said gluten from a liquid slurry thereof, the steps comprising spraying a gluten slurry as a jet having the general shape of an elongated and substantially horizontally directed thin sheet at a location spaced above the surface of a body of water, whereby gluten separates under the influence of gravity from the fluid portion of the jet above said surface of the body of water, and collecting separated gluten and fluid at locations spaced from each other on said surface of the body of water.

2. A process as claimed in claim 1, in which said jet includes a plurality of substantially parallel streams each directed not less than about ninety degrees from the vertical.

3. In a device for denaturing gluten, the combination of a tank for containing hot water having a generally vertical side wall, a conduit extending through a wall of the tank into an upper portion thereof and disposed generally diametrically in said tank, said conduit having a plurality of apertures along its length of size about one-quarter to one-half inch diameter and facing generally toward said vertical side wall of said tank, and an inlet pipe connecting with an outer end of said conduit.

4. In a device for denaturing gluten, the combination of a tank for containing hot water having a generally vertical side wall, a conduit extending through a wall of the tank into an upper portion thereof and disposed generally diametrically therein, said conduit having a plurality of horizontally directed apertures along its length facing toward said vertical side wall of said tank, an inlet pipe connected with an outer end of said conduit, movable agitating means adjacent a lower portion of said tank normally submerged in said hot water, a conduit having a conduit inlet opening in close proximity to said agitating means and extending through a wall of the tank for removing material from the vicinity of said agitating means, and an additional conduit connected with a lower portion of said tank for removing material therefrom.

BENJAMIN CLARK BOECKELER.

REFERENCES CITED

The following references are of record in the file of this patent:

UNITED STATES PATENTS

| Number | Name | Date |
|---|---|---|
| 36,048 | Allen | July 29, 1862 |
| 122,467 | Kirby | Jan. 2, 1872 |
| 340,705 | Duryea | Apr. 27, 1886 |
| 1,015,857 | Vasey | Jan. 30, 1912 |
| 1,402,318 | Rodebush | Jan. 3, 1922 |
| 1,567,313 | Wilson et al. | Dec. 29, 1925 |
| 1,577,917 | Lorraine | Mar. 23, 1926 |
| 2,024,680 | Curtis | Dec. 17, 1935 |
| 2,038,633 | Bienenstock et al. | Apr. 28, 1936 |
| 2,057,100 | Jespersen | Oct. 13, 1936 |
| 2,311,144 | Wickham et al. | Feb. 16, 1943 |
| 2,338,971 | Ross | Jan. 11, 1944 |
| 2,442,789 | Walsh et al. | June 8, 1948 |

FOREIGN PATENTS

| Number | Country | Date |
|---|---|---|
| 107,603 | Australia | June 1, 1939 |

OTHER REFERENCES

Osborne: "The Vegetable Proteins" (Longmans Green and Co., London (1924)), page 2.

Shewfelt et al.: Canadian Chem. and Process Industries, July 1944, pages 502 and 519.